(12) United States Patent
Shen

(10) Patent No.: US 12,222,520 B2
(45) Date of Patent: Feb. 11, 2025

(54) PET COMPANION ROBOT DEVICES, SYSTEMS AND METHODS

(71) Applicant: Pumpkii Inc, New York City, NY (US)

(72) Inventor: Hao Shen, New York, NY (US)

(73) Assignee: Pumpkii Inc., New York City, NY (US)

( * ) Notice: Subject to any disclaimer, the term of this patent is extended or adjusted under 35 U.S.C. 154(b) by 466 days.

(21) Appl. No.: 17/656,866

(22) Filed: Mar. 28, 2022

(65) Prior Publication Data

US 2023/0320325 A1     Oct. 12, 2023

(51) Int. Cl.
*G02B 27/20* (2006.01)
*A01K 15/02* (2006.01)
*G05D 1/00* (2024.01)

(52) U.S. Cl.
CPC ............ *G02B 27/20* (2013.01); *A01K 15/025* (2013.01); *G05D 1/0016* (2013.01); *G05D 1/0022* (2013.01); *G05D 1/0231* (2013.01)

(58) Field of Classification Search
CPC .... A01K 15/025; G02B 27/20; G05D 1/0016; G05D 1/0022; G05D 1/0231; G05D 2105/50; G05D 2107/40; G05D 2109/10; G05D 1/2247; G05D 1/689
See application file for complete search history.

(56) References Cited

U.S. PATENT DOCUMENTS

2018/0154514 A1\* 6/2018 Angle .................... G16H 20/13
2021/0041866 A1\* 2/2021 Cho ........................ B25J 9/1697

FOREIGN PATENT DOCUMENTS

KR         2017107341 A  \* 9/2017  ............ B25J 11/008

\* cited by examiner

*Primary Examiner* — Magda Cruz
(74) *Attorney, Agent, or Firm* — NKL Law; Allen Xue

(57) ABSTRACT

A method for controlling a laser pointer projection of a pet companion robot device to interact with a pet includes the steps of: determining a focal length 1 of the camera; determining a height difference $\Delta y$ between the at least one laser pointer steering motors of the laser pointer and the camera; determining a horizontal viewing angle $\alpha$ of the camera, a corresponding horizontal viewing range is $(-\alpha/2, \alpha/2)$; determining a vertical viewing angle $\beta$ of the camera, a corresponding vertical viewing range is $(-\beta/2, \beta/2)$; determining whether the touch screen of the wireless remote-control device is touched; when the touch screen of the wireless remote-control device is touched, determining the corresponding coordinates (i, j); calculating an angular difference $\Delta\theta$ between the camera and the at least one laser pointer steering motors; and calculating a horizontal steering motor rotation angle $\theta_x$; calculating a vertical steering motor rotation angle $\theta_y$.

20 Claims, 21 Drawing Sheets

PET COMPANION ROBOT DEVICES, SYSTEMS AND METHODS

BACKGROUND

1. Field of Technology

The invention relates to the technical field of remote-controlled and autonomous pet companion robot devices, systems and methods, and in particular, to pet companion robot devices, systems and methods with artificial intelligence and are connected to the Internet and metaverse.

2. Description of Related Art

The pet companion robots are related to the fields involving the interaction between robotic or robot-like devices and pets, such as the fields of robot companions, robot assistive or communicative devices in patient care or robotic and robot-like educational devices, and robot pets. The pet companion robots are also related to the fields which involve sensing devices employed with robots and devices for imparting motion to robots. The pet companion robots are further related to the fields of virtual reality (VR), augmented reality (AR) and the metaverse.

In discussing human/pet-robotic interaction, the human may be referred to as the user of the robot and/or the pet owner, the user in this case being the human who interacts with the robot which further interacts and engages with the pet. The user of the robot and/or the pet owner can control the robot with a remote device connected to the robot via Wi-Fi, the cellular network (3G/4G/5G, etc.), and Internet. The user of the robot and/or the pet owner can also control the robot with VR/AR enabled wearable devices, which may enable the user to interact with the pet in the metaverse. The robot may also work in AI-enabled autonomous modes when the user is absent. In both the remote-control modes and autonomous modes, the embedded algorithms are capable of conducting deep-learning to optimize the performance of the robot.

SUMMARY

A method for controlling a laser pointer projection of a pet companion robot device, for interacting with a pet, equipped with a camera, a laser pointer, a horizontal laser pointer steering motor and a vertical laser pointer steering motor, a control unit and a wireless remote-control device with a touch screen, is disclosed. The method includes: determining a focal length $l$ of the camera; determining a height difference $\Delta y$ between the at least one laser pointer steering motors of the laser pointer and the camera; determining a horizontal viewing angle $\alpha$ of the camera, a corresponding horizontal viewing range is $(-\alpha/2, \alpha/2)$; determining a vertical viewing angle $\beta$ of the camera, a corresponding vertical viewing range is $(-\beta/2, \beta/2)$; determining whether the touch screen of the wireless remote-control device is touched; when the touch screen of the wireless remote-control device is touched, determining the corresponding coordinates (i, j); calculating an angular difference $\Delta\theta$ between the camera and the at least one laser pointer steering motors:

$$\Delta\theta \approx \frac{\beta}{2} - \arctan\left(\frac{l \times \tan\left(\frac{\beta}{2}\right) - \Delta y}{l}\right);$$

calculating a horizontal steering motor rotation angle $\theta_x$:

$$\theta_x = -\alpha/2 + \frac{\alpha}{16} \times j + \frac{\alpha}{32};$$

calculating a vertical steering motor rotation angle $\theta_y$:

$$\theta_y = -\beta/2 + \frac{\beta}{9} \times i + \frac{\beta}{18} + \Delta\theta.$$

According to some embodiments, the method further includes: transmitting the horizontal steering motor rotation angle $\theta_x$ to the control unit. According to some embodiments, the method further includes: transmitting the vertical steering motor rotation angle $\theta_y$ to the control unit. According to some embodiments, the method further includes: rotating the horizontal steering motor by the rotation angle $\theta_x$; and rotating the vertical steering motor by the rotation angle $\theta_y$. According to some embodiments, the method further includes: the horizontal steering motor is reset; and the vertical steering motor is reset. According to some embodiments, the calculating a horizontal steering motor rotation angle $\theta_x$ is performed on the wireless remote-control device with a touch screen. According to some embodiments, the calculating a horizontal steering motor rotation angle $\theta_y$ is performed on the wireless remote-control device with a touch screen. According to some embodiments, the calculating a horizontal steering motor rotation angle $\theta_x$ is performed on a server in the cloud. According to some embodiments, the calculating a horizontal steering motor rotation angle $\theta_y$ is performed on a server in the cloud. According to some embodiments, the method further includes: determining whether the touch screen of the wireless remote-control device is touched again. According to some embodiments, the method further includes: when the touch screen of the wireless remote-control device is touched again, determining the corresponding coordinates (i', j'). According to some embodiments, the method further includes: calculating a new horizontal steering motor rotation angle $\theta_x'$:

$$\theta_x' = -\alpha/2 + \frac{\alpha}{16} \times j' + \frac{\alpha}{32}.$$

According to some embodiments, the method further includes: calculating a new vertical steering motor rotation angle $\theta_y'$:

$$\theta_y' = -\beta/2 + \frac{\beta}{9} \times i' + \frac{\beta}{18} + \Delta\theta.$$

According to some embodiments, the method further includes: transmitting the new horizontal steering motor rotation angle $\theta_x'$ to the control unit. According to some embodiments, the method further includes: transmitting the new vertical steering motor rotation angle $\theta_y'$ to the control unit. According to some embodiments, the method further includes: rotating the horizontal steering motor by the new rotation angle $\theta_x'$; and rotating the vertical steering motor by the new rotation angle $\theta_y'$. According to some embodiments, the method further includes: the horizontal steering motor is reset; and the vertical steering motor is reset. According to some embodiments, the touch screen displays a real-time video streaming from the camera.

According to some embodiments, a pet companion robot device, for interacting with a pet, controlled by a user with a wireless remote-control device with a touch screen is disclosed. The pet companion robot device includes: a chassis with a moving mechanism for moving the pet companion robot device; a camera for providing a live streaming video or photo of the pet to the touch screen of the wireless remote-controlled device, the camera has a local length 1, a horizontal viewing angle α and a corresponding horizontal viewing range (−α/2, α/2), a vertical viewing angle β and a corresponding vertical viewing range (−β/2, β/2); a laser pointer controlled by a horizontal laser pointer steering motor and a vertical laser pointer steering motor for pointing a laser beam; and a control unit for controlling the moving mechanism, the camera and the horizontal laser pointer steering motor and the vertical laser pointer steering motor, the control unit communicates with wireless remote-controlled device with the touch screen. According to some embodiments, a height difference between the horizontal and vertical laser pointer steering motors of the laser pointer and the camera is Δy.

BRIEF DESCRIPTION OF DRAWINGS

The teachings of the present invention can be readily understood by considering the following detailed description in conjunction with the accompanying drawings.

DETAILED DESCRIPTION

Figure 1:
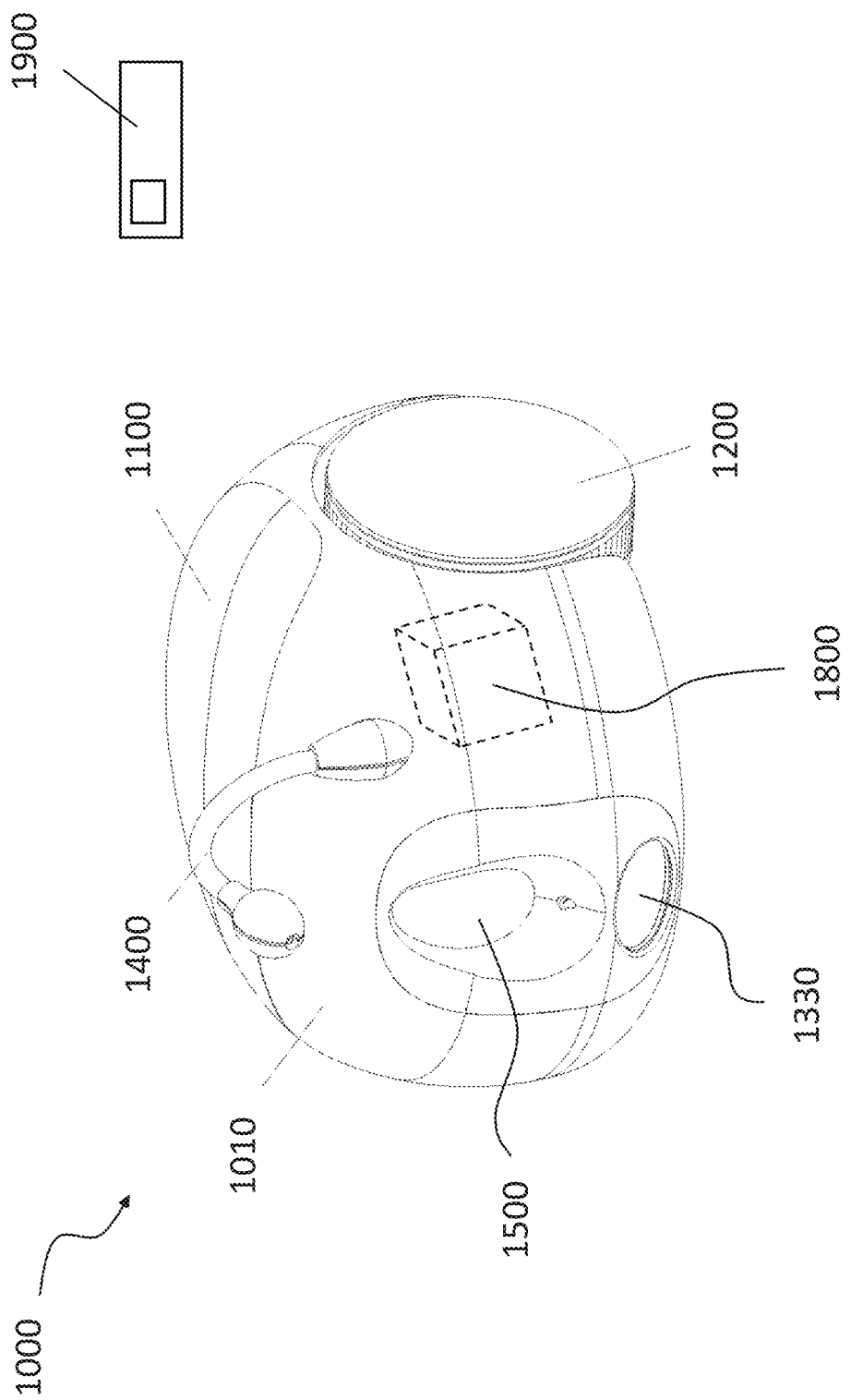
FIG. 1 schematically illustrates a pet companion robot device, according to some embodiments.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 schematically illustrates a pet companion robot device, according to some embodiments. According to some embodiments, a pet companion robot device 1000 includes a shell 1010, which can also be referred to as the body of the pet companion robot device. The shell 1010 of pet companion robot device is constructed to enclose the pet companion robot, which may include other parts, components and structures inside. The shell 1010 of pet companion robot device can be constructed with various materials, such as, but not limited to, plastic, metal, composite and/or a combination thereof. According to some embodiments, the shell 1010 of the pet companion robot device 1000 includes a lid, or cover 1100. The lid 1100 can be opened, or moved to expose the internal structures inside the shell 1010. According to some embodiments, the shell 1010 of the pet companion robot device 1000 includes moving mechanisms 1200 for moving the pet companion robot. According to some embodiments, the moving mechanisms 1200 can be a plurality of wheels, the number of wheels can be, for example, one, two, three, four, or more, when appropriate. The moving mechanisms 1200 can be two-wheel differential, or four-wheel drive. According to some embodiments, the moving mechanisms 1200 can also be tracks, or continuous track, Mecanum wheels for moving the pet companion robot. According to some embodiments, the moving mechanisms 1200 can be any other structures and/or mechanism for moving the robot.

The Mecanum wheel is an omnidirectional wheel design for a land-based vehicle to move in any direction. It is sometimes called the Swedish wheel or Ilon wheel after its inventor, Bengt Erland Ilon. The Mecanum wheel is based on a tireless wheel, with a series of rubberized external rollers obliquely attached to the whole circumference of its rim. These rollers typically each have an axis of rotation at 45° to the wheel plane and at 45° to the axle line. Each Mecanum wheel is an independent non-steering drive wheel with its own powertrain. When spinning, each Mecanum wheel generates a propelling force perpendicular to the roller axle, which can be vectored into a longitudinal and a transverse component in relation to the chassis.

According to some embodiments, a pet companion robot device 1000 further includes an image sensing device 1500, which can be, for example, a camera, a video camera, or any other devices that can be used to receive image information. Such image sensing devices, cameras and video cameras can work in the visible light range, infrared range and/or any other suitable range in the electro-magnetic spectrum. According to some embodiments, a pet companion robot device 1000 can further include a dispenser 1300 for dispensing pet food, treats, and/or other substance that may be of interest of pets, 1330 is the outlet of the dispenser. According to some embodiments, a pet companion robot device 1000 can further include an engagement mechanism 1400 for engaging with the target pets. The engagement mechanism 1400 can be, for example, a movable light source, a movable laser pointer, a puffer, a speaker, a pheromone dispenser, a movable mechanical structure, and/or any other suitable components that can engage, or interact with the pets.

According to some embodiments, a pet companion robot device 1000 includes an electronic control unit 1800 inside the shell 1010 for controlling all components of the pet companion robot device 1000. The electronic control unit 1800 is usually hidden inside the shell 1010 and is typically no visible from outside the shell 1800. For example, the electronic control unit 1800 controls the motor, or motors to move the moving mechanisms 1200 so that the pet companion robot can move to a target location. The electronic control unit 1800 also controls, for example, the cameras onboard, the laser pointer, the treat dispenser, etc. According to some embodiments, the electronic control unit 1800 of the pet companion robot is connected to a home network, or the Internet. An ordinary person skilled in the art would understand that the electronic control unit 1800 of the pet companion robot may include components such as, batteries (rechargeable batteries), electric motors, circuit boards, integrated circuits, memories/storage, processing units/CPUs, control logic, network interfaces, antennas, etc.

According to some embodiments, the pet companion robot can function autonomously without human interaction. In such autonomous mode, the electronic control unit 1800 may be equipped with artificial intelligence (AI) modules for making real time smart decisions. According to some embodiments, the pet companion robot can alternatively be controlled remotely by a user, a pet owner, and/or someone authorized by the pet owner to interact with the pet. Through a home network, or the Internet, the remote controller (1900 in FIG. 1) can control the pet companion robot with a dedicated remote controller device, or a smart hand held device, such as but not limited to, a PDA, a smart phone, an iPhone, an iPad, a laptop, etc. In the context of virtual reality, augmented reality or metaverse, the remote controller can be a wearable device, such as a VR/AR goggle and its companion gesture control devices. A metaverse is a network of 3D virtual worlds focused on social connection. It is often described as a hypothetical iteration of the Internet as a single, universal virtual world that is facilitated by the use of virtual and augmented reality headsets, goggles and other devices. Several components of metaverse technologies have already been developed within modern internet-enabled video games. Access points for metaverses include general-purpose computers and smartphones, in addition to augmented reality (AR), mixed reality, virtual reality (VR), and virtual world technologies. With the rapid development of VR and metaverse, new devices and equipment's can be used to control the pet companion robot for enhanced engagement experience.

Figure 2:
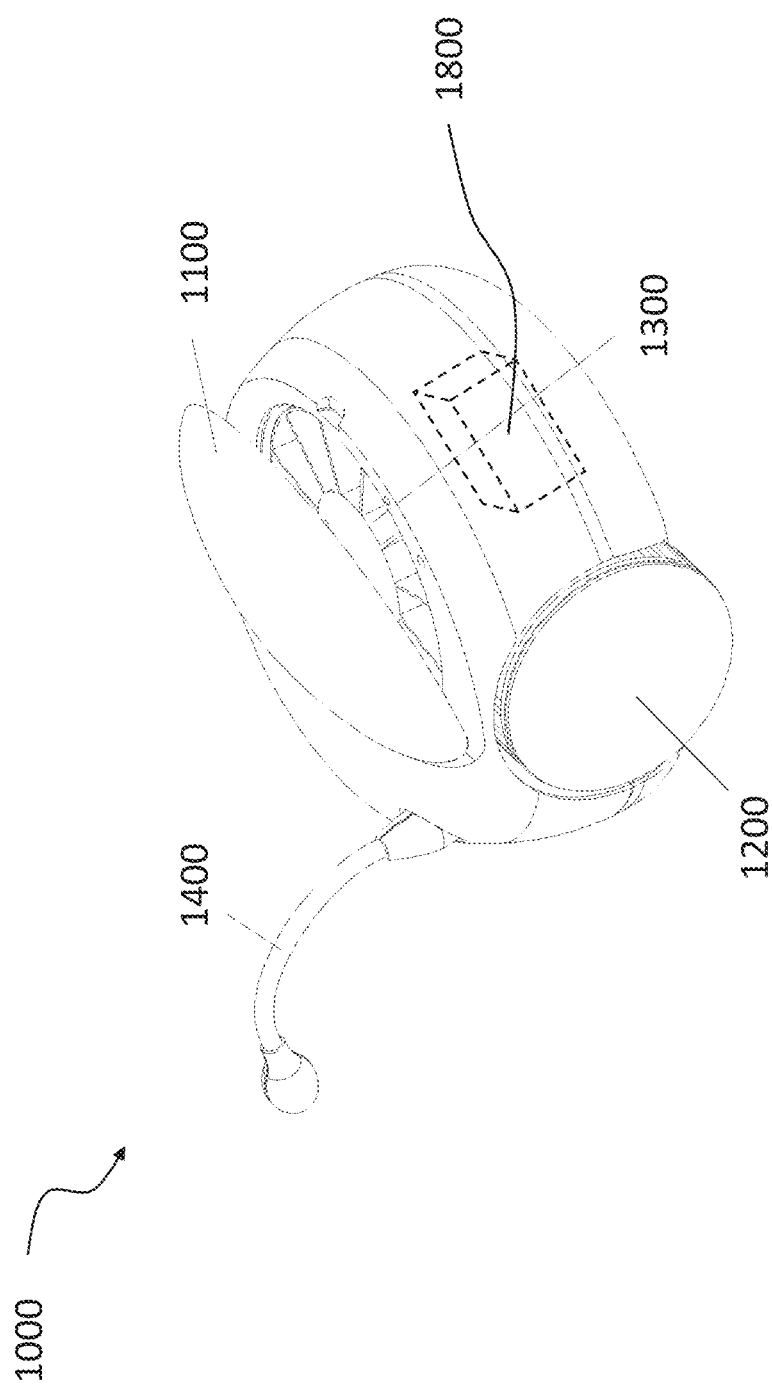
FIG. 2 schematically illustrates a pet companion robot device, according to some embodiments.

FIG. 2 schematically illustrates a pet companion robot device, according to some embodiments. According to some embodiments, FIG. 2 illustrates a different view of the pet companion robot device 1000, with the lid 1100 opened up showing some internal components and/or structures inside the shell 1010 of the pet companion robot device 1000. The internal structures and/or components include, for example, a dispenser 1300 for dispensing pet food, treats, and/or other substance that may be of interest of pets. The more detailed structure of the dispenser 1300 is further illustrated in the FIG. 3 below.

Figure 3:
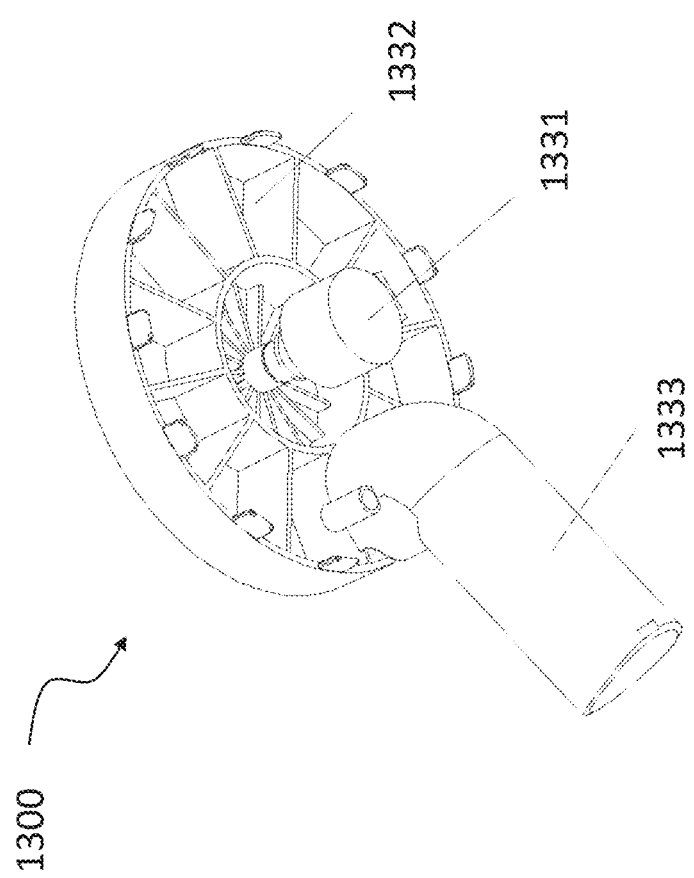
FIG. 3 schematically illustrates detailed structures of a pet companion robot device, according to some embodiments.
Figure 4:
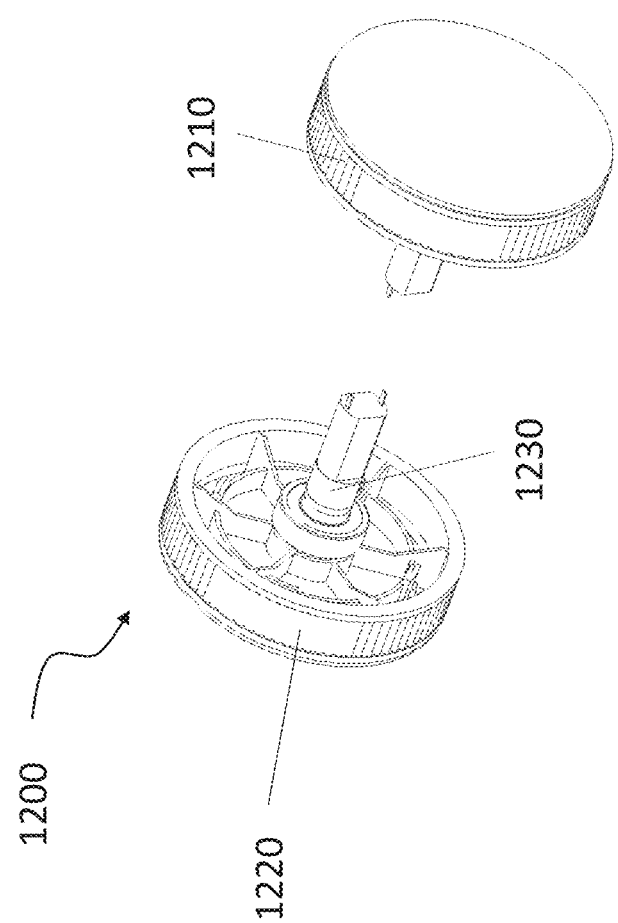
FIG. 4 schematically illustrates detailed structures of a pet companion robot device, according to some embodiments.

FIG. 3 schematically illustrates detailed structures of a pet companion robot device, according to some embodiments. According to some embodiments, FIG. 3 illustrates the detailed structures of the dispenser 1300 for dispensing pet food, treats, and/or other substance that may be of interest of pets. The dispenser 1300 includes a dispenser motor 1331 for driving and/or rotating the dispenser 1300. According to some embodiments, the dispenser motor 1331 can be an electric motor powered by a power source in the pet companion robot device, the power source can be, for example, batteries and/or rechargeable batteries. The dispenser 1300 also includes storage units 1332 for storing pet food, treats, and/or other substance that may be of interest of pets. The dispenser 1300 also includes a dispensing outlet 1333 to allow the pet food or treats to be dispensed FIG. 4 schematically illustrates detailed structures of a pet companion robot device, according to some embodiments. According to some embodiments, the pet companion robot device 1000 includes a moving mechanism 1200 for moving the pet companion robot. The moving mechanism 1200 can be, for example, a plurality of wheels. As illustrated in FIG. 4, moving mechanism 1200 can include at least a pair of driving wheels 1210 and 1220 driven by at least one driving motor 1230, there can be additional driving motors and additional driving wheels according to appropriate designs. The electric motors, and thus the wheels, are powered by batteries and controlled by the control unit 1800, which is further controlled by a remote user and/or pet owner through a hand-held device over the home network, the cellular network or the Internet. Alternatively, in an autonomous mode, the control unit 1800 can be controlled by AI modules embedded inside the control unit 1800 or located in the cloud. Through the home network, the cellular network or the Internet, the pet companion robot can interact with other pet companion robots, or devices with compatible capabilities.

Figure 5:
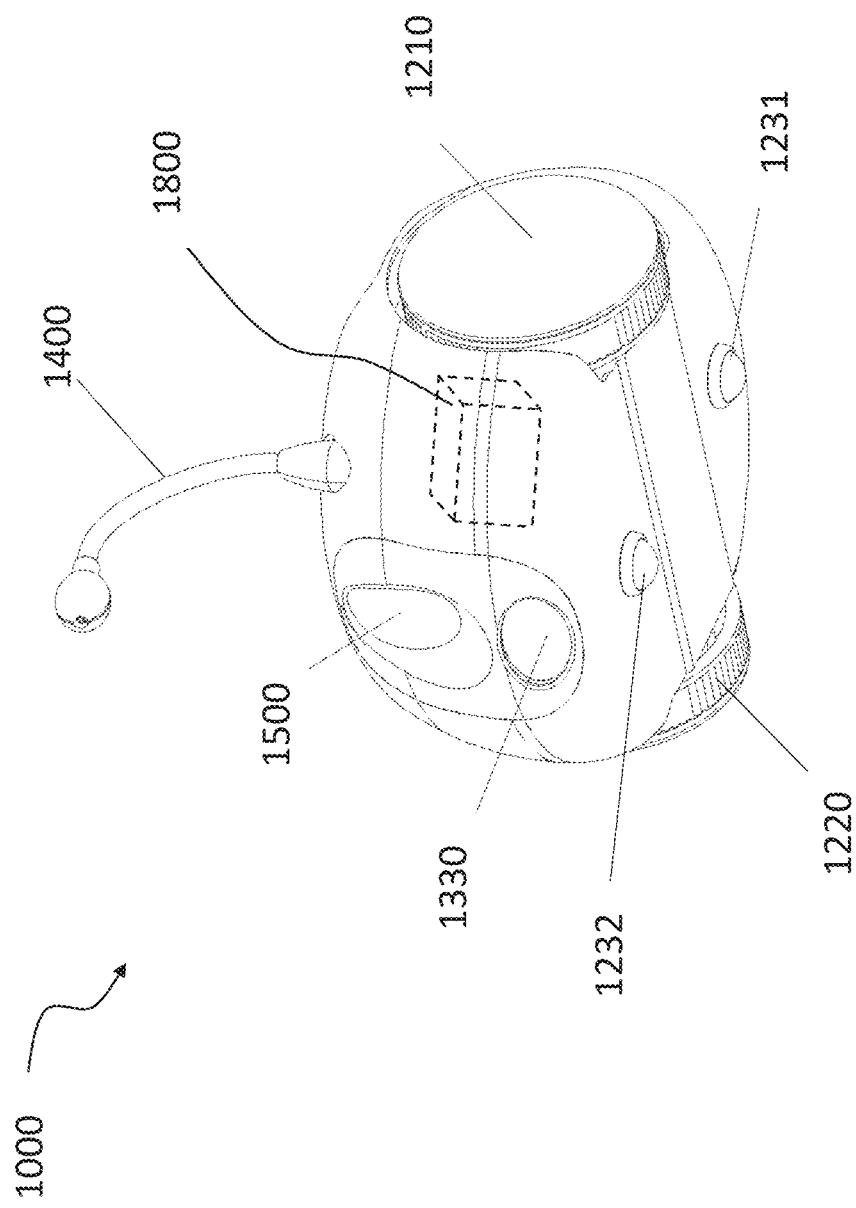
FIG. 5 schematically illustrates a pet companion robot device, according to some embodiments.

FIG. 5 schematically illustrates a pet companion robot device, according to some embodiments. According to some embodiments, FIG. 5 illustrates another different view of the pet companion robot device 1000, in this view, two auxiliary wheels 1231 and 1232 are illustrated, which are implemented, for example, to balance the pet companion robot device 1000, especially during movements.

Figure 6:
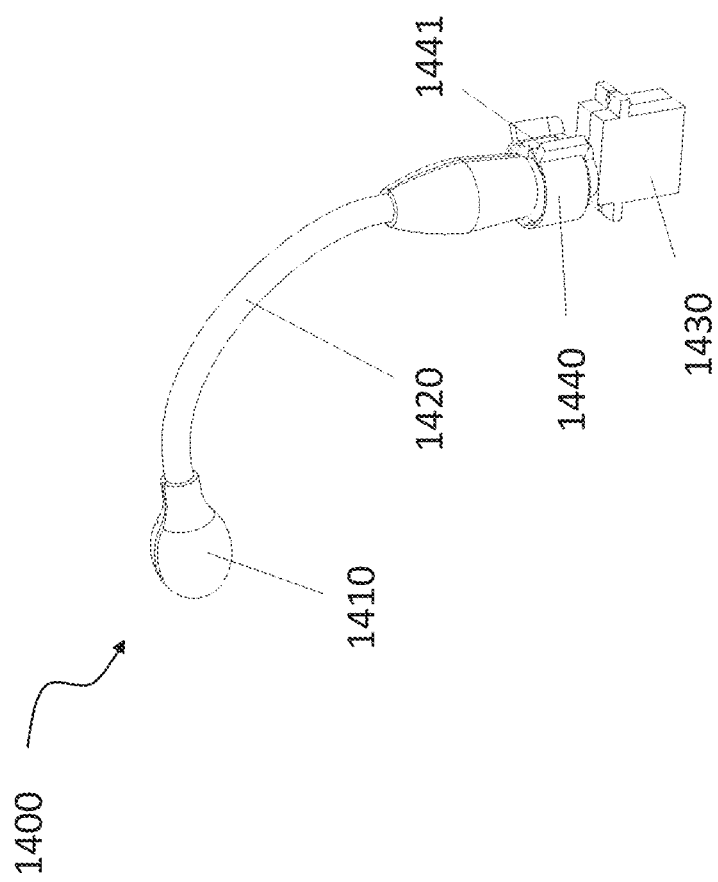
FIG. 6 schematically illustrates detailed structures of a pet companion robot device, according to some embodiments.

FIG. 6 schematically illustrates detailed structures of a pet companion robot device, according to some embodiments. According to some embodiments, the engagement mechanism 1400 is illustrated in FIG. 6. The engagement mechanism 1400 is controlled by a user or a pet owner, who is typically remote from the pet, to interact and play with the pet. The user or pet owner can also be in the same room, or within a visible distance with the pet or pets. The user or the pet owner receives real time images or video streaming captured by the camera 1500 over the home network, the cellular network or the Internet, thus to monitor the pet in real time. When the user or the pet owner decides to engage, or stimulate or play with the pet, she can do so on her hand-held device which remotely controls the wheels and the engagement mechanism 1400 of the pet companion robot. If the user or the pet owner decides to do so, she can give a stimulus to the pet through the engagement mechanism 1400, the stimulus can be, for example, a laser beam, a light spot, a puff, a sound, a smell, a sniff of pheromone, and/or a mechanical vibration or movement of a physical object, etc. And in collaboration with the dispenser 1300, the stimulus can also be pet food or treats.

According to some embodiments, the engagement mechanism 1400 includes, for example, a light source 1441, which can be a laser pointer, or an ordinary light source with direction control. The engagement mechanism 1400 also includes a pole 1420, which is bendable to change the pointing of the light source 1441, and a plurality of light source control motors 1430 to control the movement and position of the engagement mechanism and the light source. 1430 includes a horizontal laser pointer steering motor and a vertical laser pointer steering motor. 1440 and 1441 are electric wire connector and inlet.

Figure 7:
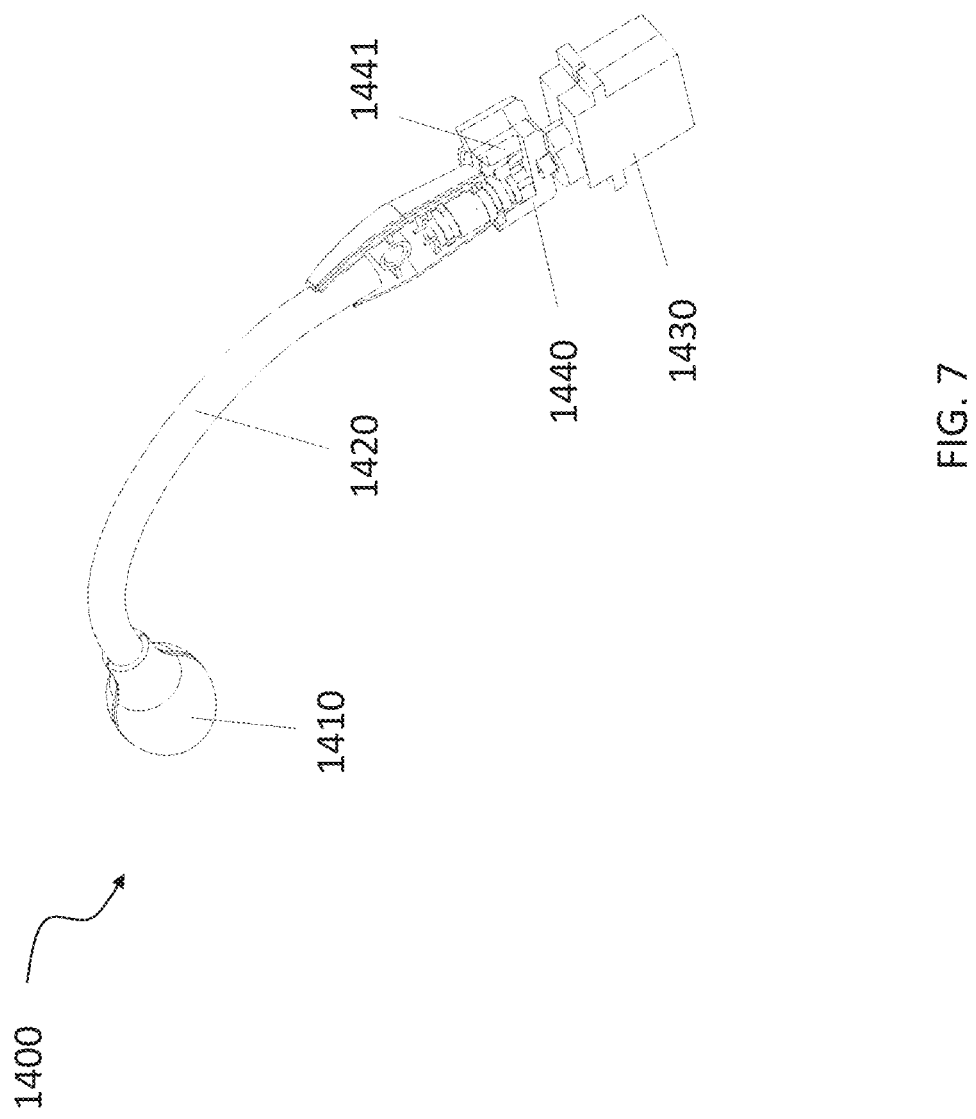
FIG. 7 schematically illustrates detailed structures of a pet companion robot device, according to some embodiments.

FIG. 7 schematically illustrates detailed structures of a pet companion robot device, according to some embodiments. A different view of the engagement mechanism 1400 is illustrated in FIG. 7. According to some embodiments, the number of light source control motors 1430 can be two, i.e., there can be two light source control motors, one for controlling horizontal position of the light source pointing position, and another for controlling the vertical position of the light source pointing position, details will be discussed in FIGS. 18-21 and corresponding paragraphs below.

Figure 8:
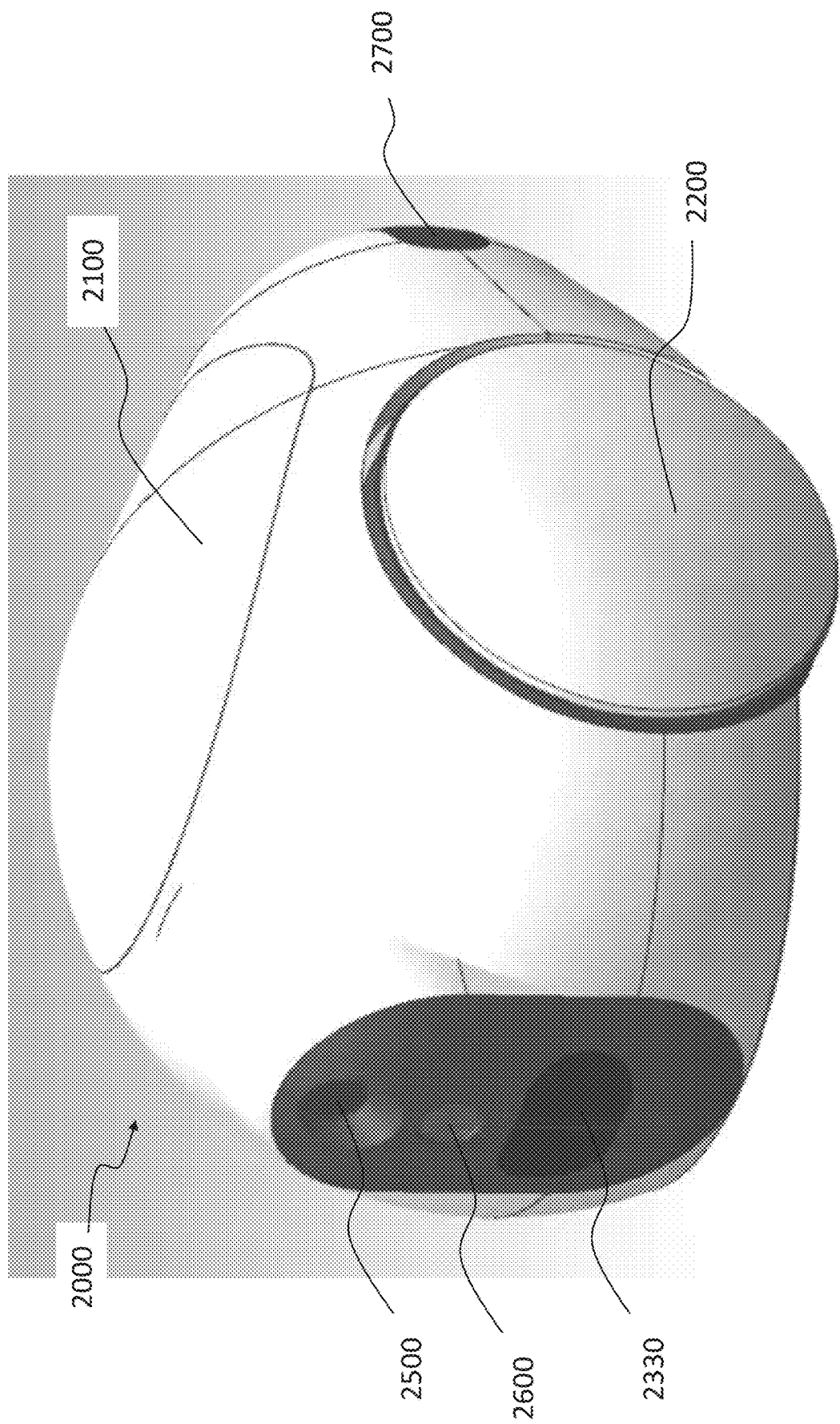
FIG. 8 schematically illustrates a pet companion robot device, according to some embodiments.

FIG. 8 schematically illustrates a pet companion robot device, according to some embodiments. According to some embodiments, another pet companion robot device 2000 is illustrated in FIG. 8, which includes, for example, a lid 2100, wheels 2200, a camera 2500, a night vision light source 2600, an obstacle sensor 2330, a recharging sensor 2700. The camera 2500 captures still images and/or live video streaming. When it is dark, the night vision light source 2600 provides additional lighting for the camera 2500 to capture quality still images and/or live video streaming. In addition to visible light spectrum, the camera 2500 can be designed to work in other feasible spectrums, including but not limited to infrared. Correspondingly, the night vision light source 2600 can provide additional lighting either in the visible light range, or outside the visible light range, including but not limited to infrared. The obstacle sensor 2330 is implemented to sense any obstacles surrounding the pet companion robot. The obstacle sensor 2330 can be implemented with, for example, LiDar. The obstacle sensor 2330 is controlled by the control unit 1800. The recharging sensor 2700 is implemented for the pet companion robot to locate its recharging station while roaming around before exhausting its batteries.

Figure 9:
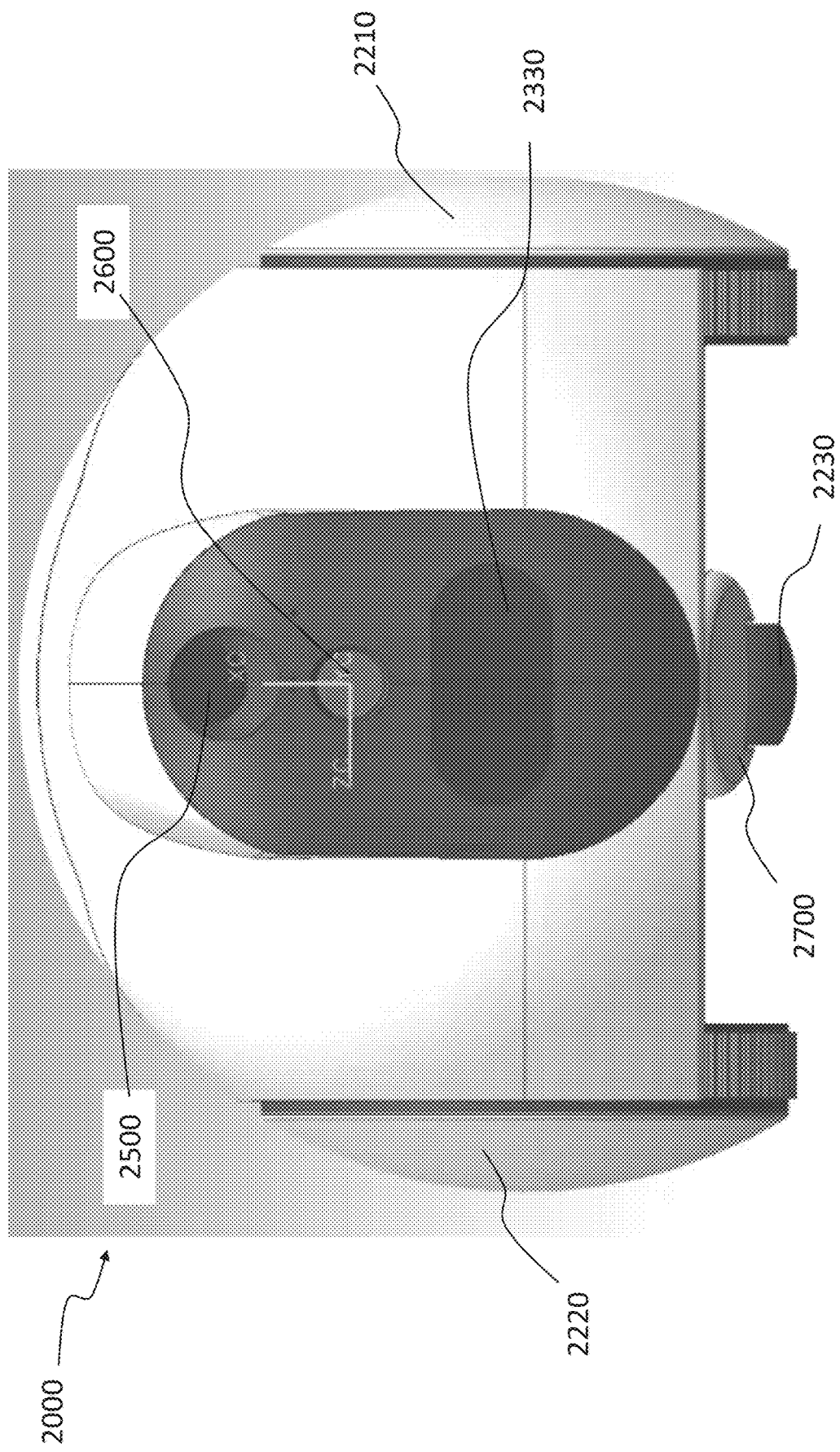
FIG. 9 schematically illustrates a front view of the pet companion robot device in FIG. 8, according to some embodiments.

FIG. 9 schematically illustrates a front view of the pet companion robot device in FIG. 8, according to some embodiments. In the front view, the dispenser outlet 2700 is located on the bottom of the robot for dispensing pet food or treats. An auxiliary wheel 2230 is also illustrated in the front view for balancing the robot.

Figure 10:
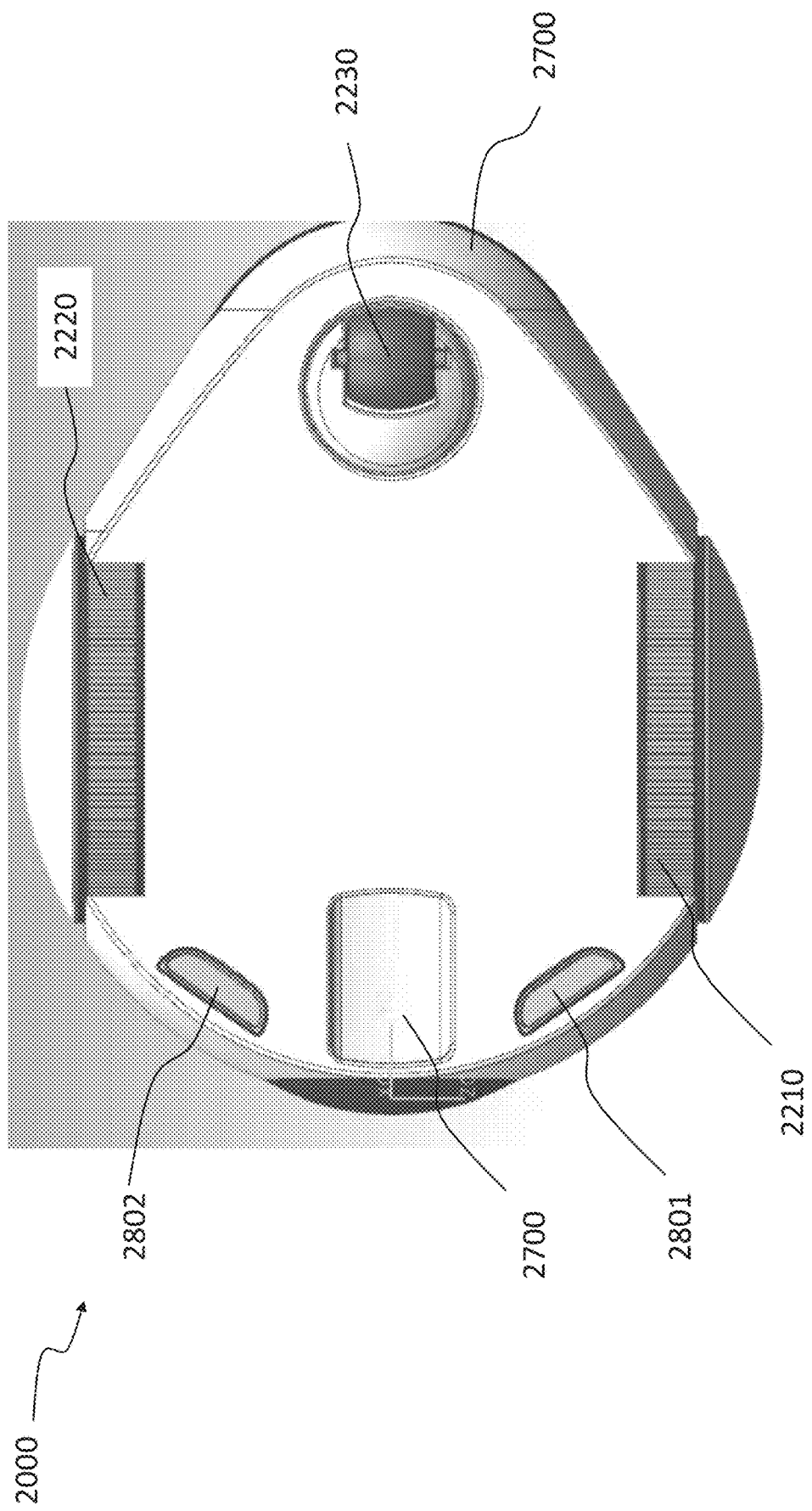
FIG. 10 schematically illustrates a bottom view of the pet companion robot device in FIG. 8, according to some embodiments.

FIG. 10 schematically illustrates a bottom view of the pet companion robot device in FIG. 8, according to some embodiments. In the bottom view, two falling sensors 2801 and 2802 are illustrated. The falling sensors 2801 and 2802 are implemented to detect the potential falling of the robot to ensure the safe movement of the robot. The wheels 2210 and 2220 are covered with curved covers to smooth the contour of the robot. The auxiliary wheel 2230 forms a triangle with the other two wheels 2210 and 2220 to provide better stability of the robot, especially during movement.

Figure 11:
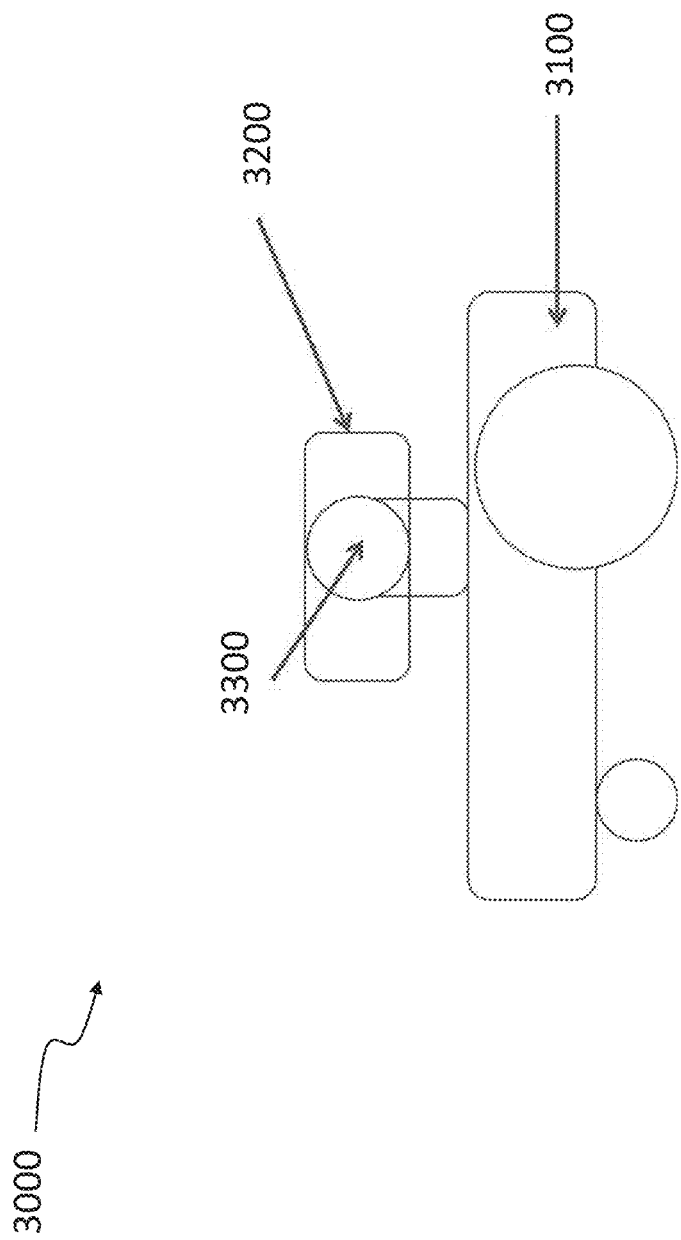
FIG. 11 schematically illustrates a depth-of-field tracking device for the pet companion robot, according to some embodiments.

FIG. 11 schematically illustrates a depth-of-field tracking device for the pet companion robot, according to some embodiments. According to some embodiments, the pet companion robot device 3000 includes a chassis 3100 with moving mechanisms such as wheels, tracks and Mecanum wheels, etc. as discussed above in FIGS. 1-10 and corresponding paragraphs. The pet companion robot device 3000 also includes a camera 3200 as discussed above in FIGS. 1-10 and corresponding paragraphs. To adjust the direction of the camera 3200, at least a pitch motor 3300 is implemented to pitch, i.e., to point up and down, the camera. Additional motors, such as a yaw motor can be implemented to yaw, i.e., to point left and right, the camera. To save the yaw motor, the yaw can also be implemented by the movement of the wheels. For example, when the left and right wheels move in differential mode, i.e., in opposite directions, yaw can be achieved. As another example, yaw can be achieved with the implementation of Mecanum wheels. Pitch and yaw are implemented in coordination with the onboard control unit to achieve depth-of-field tracking of a target pet. The control unit is equipped with, for example, AI software implementing AI algorithms, such as deep learning.

Figure 12:
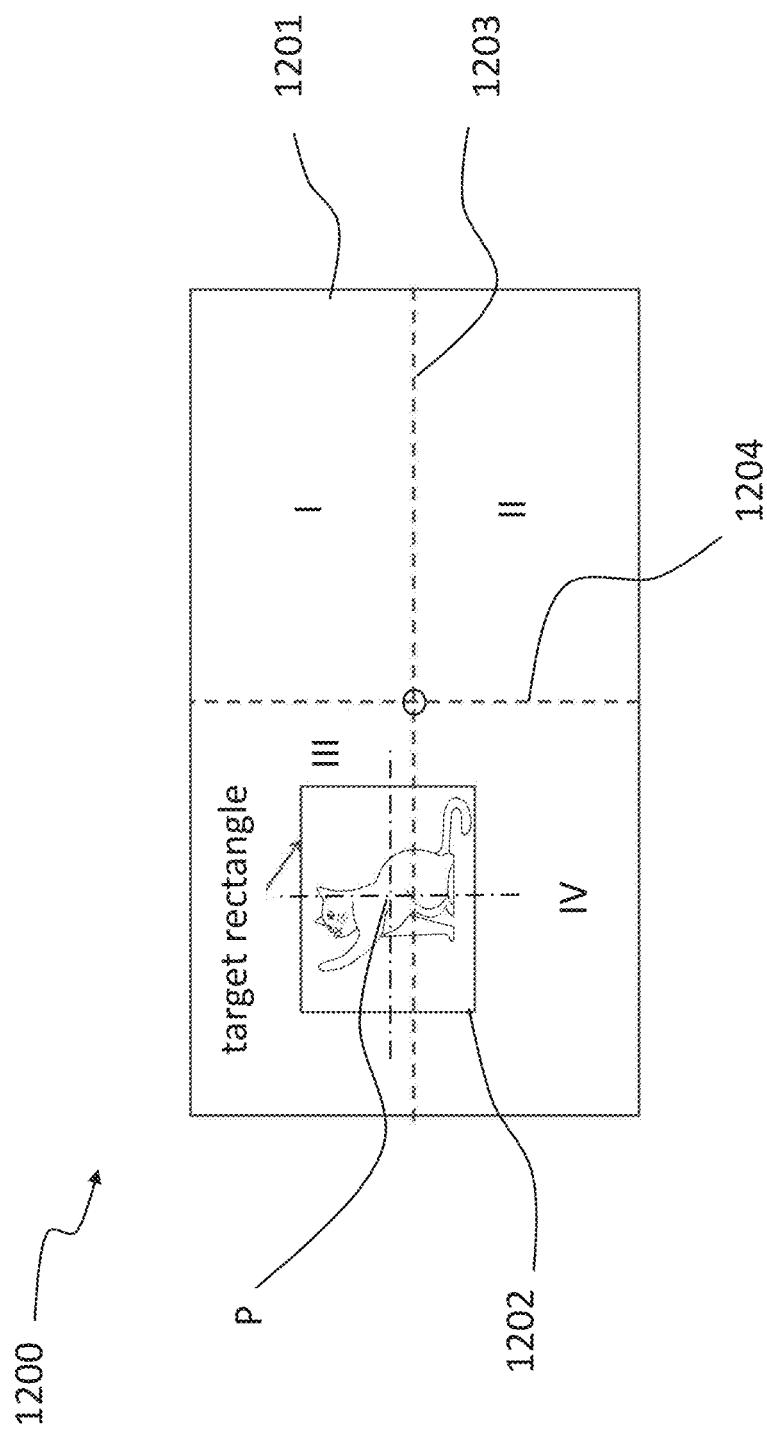
FIG. 12 schematically illustrates the depth-of-field tracking method for the pet companion robot, according to some embodiments.

FIG. 12 schematically illustrates the depth-of-field tracking method for the pet companion robot, according to some embodiments. According to some embodiments, the field of view 1201 of the camera captures a target pet with AI software based on, for example deep learning algorithms. Then the AI software draws a minimum target rectangle 1202 around the target pet, as illustrated in FIG. 12. The line 1203 is the horizontal center line of the field of view 1201, and line 1204 is the vertical center line of the field of view 1201. The crossing of the center lines 1203 and 1204 is point O, which is the center point of the field of view 1201. The center lines 1203 and 1204 divides the field of view 1201 into four quadrangles, I, II, III and IV. The minimum target rectangle 1202 also has a center point P defined by a corresponding horizontal center line and a vertical center line.

According to some embodiments, the control software in the pet companion robot determines which quadrangle the center point P (of the minimum target rectangle 1202) is located in the field of view 1201. If the center point P is located in quadrangles I and II, then the target rectangle 1202 in on the right side of the field of view 1201. Otherwise, the center point P is located in the quadrangles III and IV, and is on the left side of the field of view. If the center point P is on the right side, then the pet companion robot moves the target rectangle 1202 to the left until the center point P falls on the vertical center line 1204, which can be achieved by either yawing the camera with a yaw motor, or by moving the chassis of the pet companion robot. For example, if the pet companion robot is equipped with Mecanum wheels, then the chassis can be rotated to yaw the camera appropriately to put the center point P on the vertical center line 1204. Similarly, if the center point P is on the left side, then the pet companion robot moves the target rectangle 1202 to the right until the center point P falls on the vertical center line 1204, which can be achieved by either yawing the camera with a yaw motor, or by moving the chassis of the pet companion robot. For example, if the pet companion robot is equipped with Mecanum wheels, then the chassis can be rotated to yaw the camera appropriately to put the center point P on the vertical center line 1204.

Figure 13:
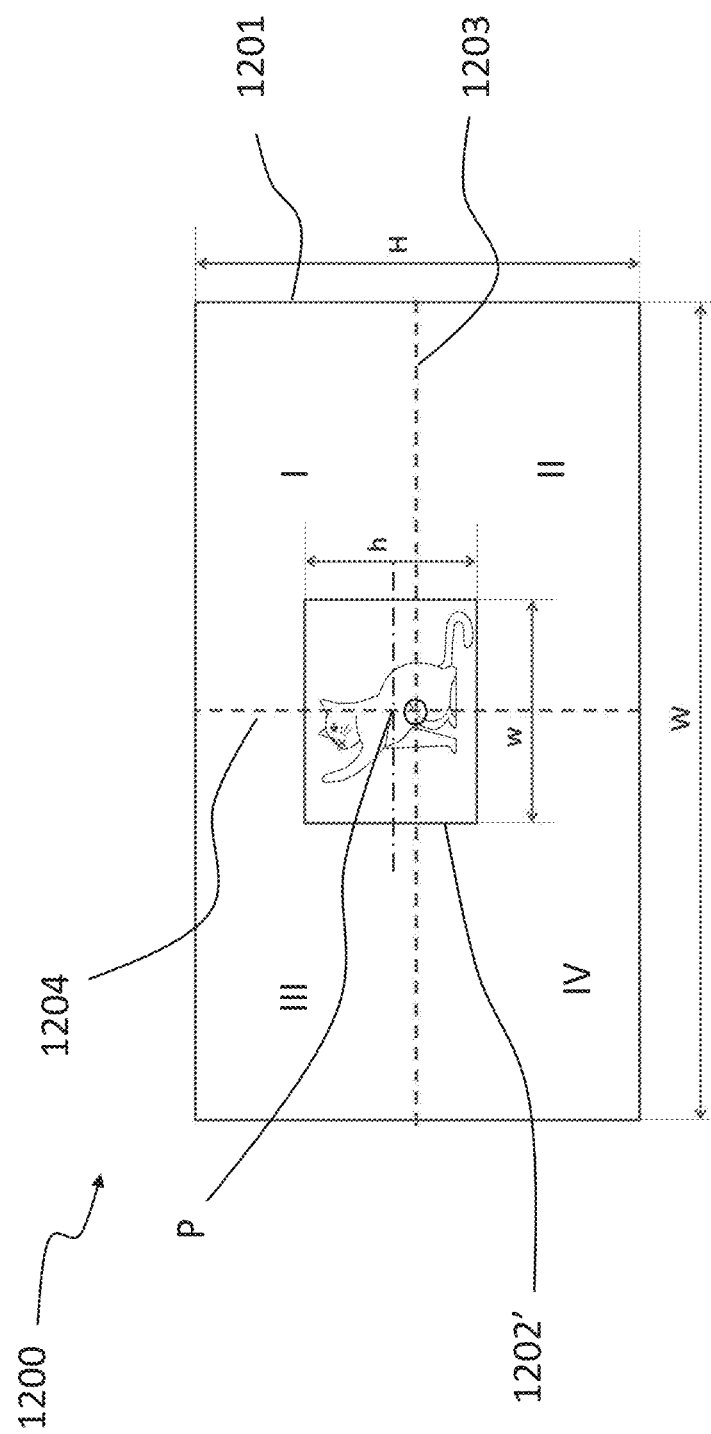
FIG. 13 schematically illustrates the depth-of-field tracking method for the pet companion robot, according to some embodiments.

FIG. 13 schematically illustrates the depth-of-field tracking method for the pet companion robot, according to some embodiments. According to some embodiments, an expected depth (EP) represents the ratio between the area of the target rectangle and the area of the field of view. The recommended value of EP is between 0.1 and 0.5, inclusive. The actual depth, or real depth RP is the actual ratio between the area of the target rectangle and the area of the field of view measured in the camera, $RP=(w*h)/(W*H)$, where w is the width of the target rectangle, h is the height is the target rectangle, W is the width of the field of view of the camera and H is the height of the field of view of the camera. The units of the above measures are in pixels. When RP is smaller than the expected depth EP, then the motor is started to move the pet companion robot closer to the pet, until RP is equal EP. Otherwise, if RP is larger than EP, the motor is started to move the pet companion robot backward and farther away from the pet, until RP is equal EP.

Figure 14:
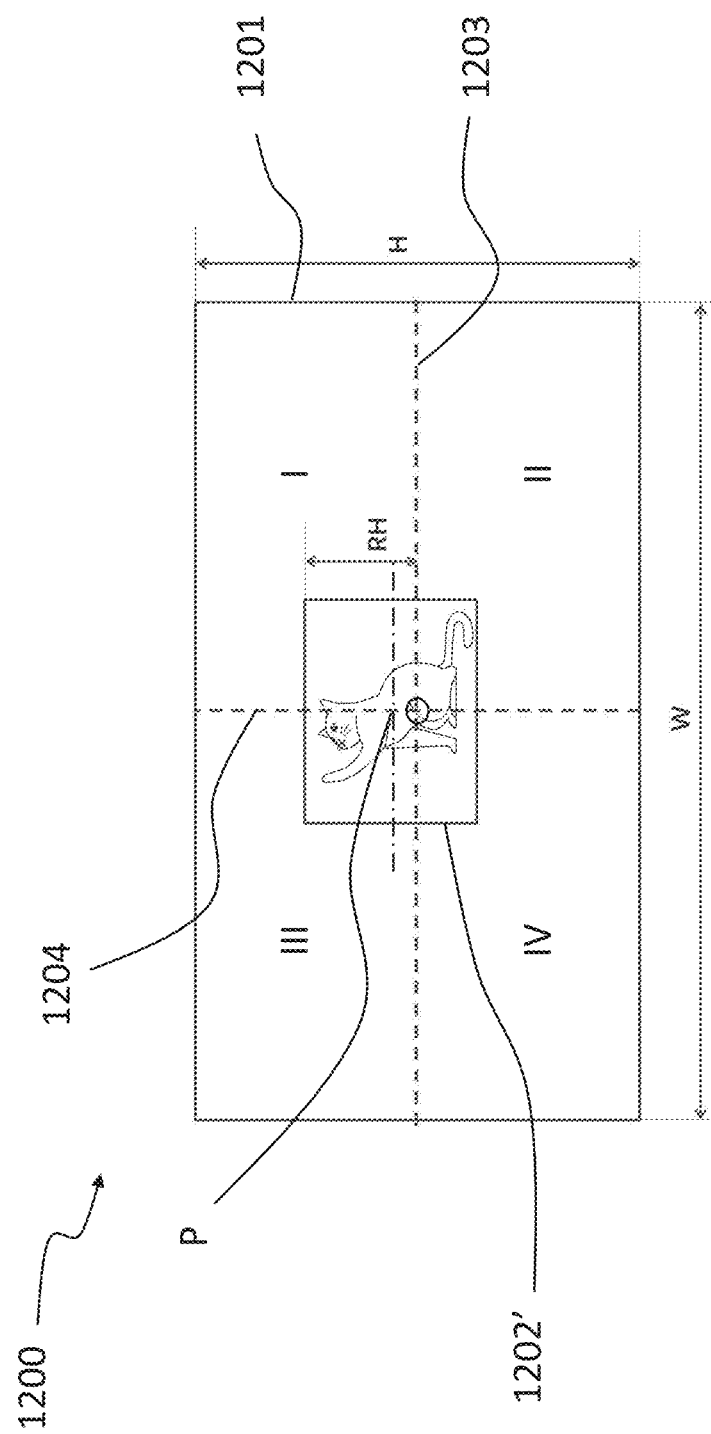
FIG. 14 schematically illustrates the depth-of-field tracking method for the pet companion robot, according to some embodiments.
Figure 15:
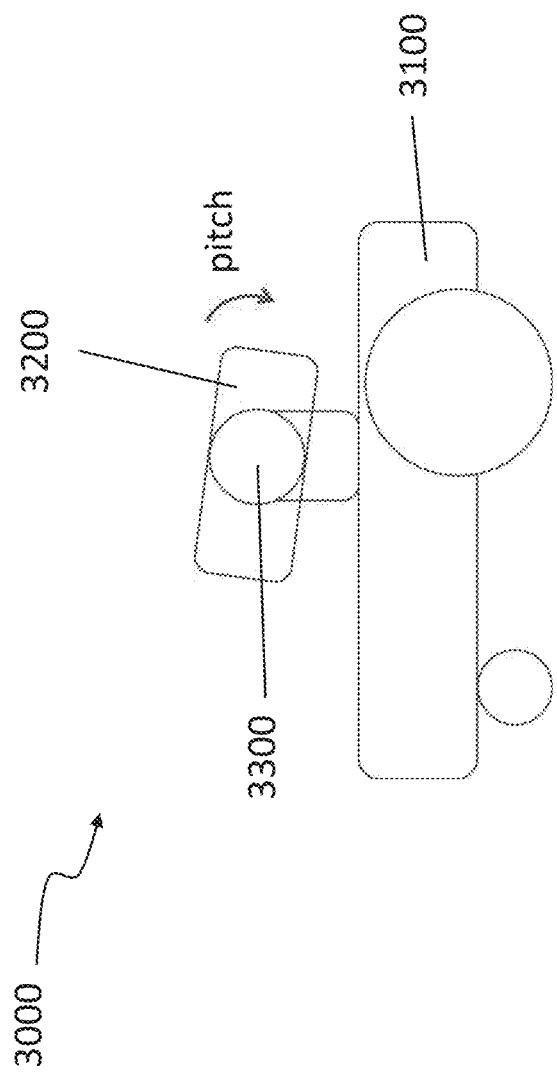
FIG. 15 schematically illustrates the depth-of-field tracking method for the pet companion robot, according to some embodiments.
Figure 16:
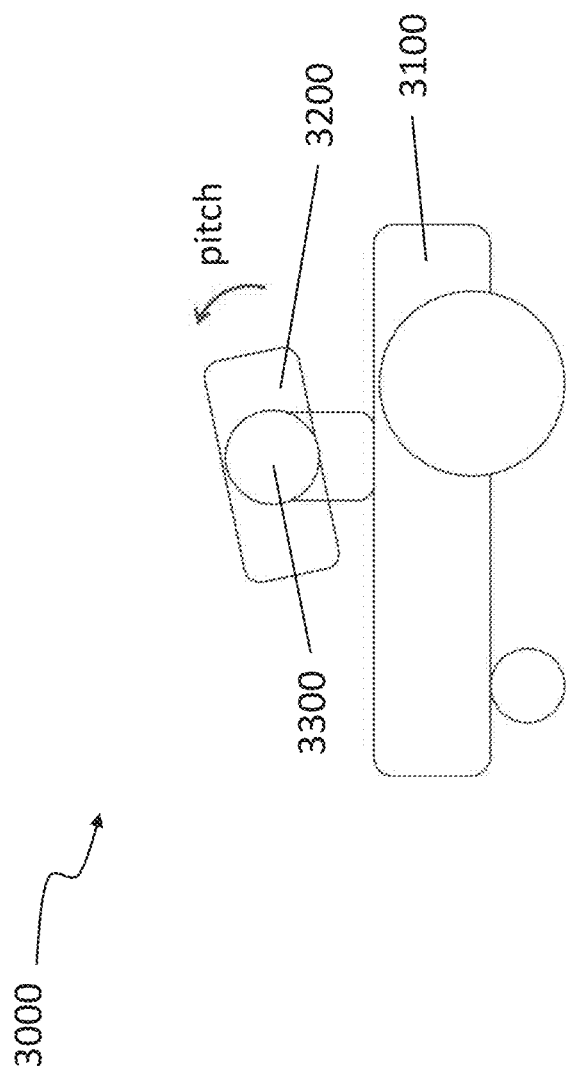
FIG. 16 schematically illustrates the depth-of-field tracking method for the pet companion robot, according to some embodiments.

FIG. 14 schematically illustrates the depth-of-field tracking method for the pet companion robot, according to some embodiments. According to some embodiments, RH is the distance between the upper edge of the target rectangle 1202 and the horizontal center line 1203 of the field of view. And EH is the recommended value of RH, the value of EH is between H/6 and H/3, meaning between ⅙ and ⅓ of the total height of the field of view 1201. During the movement of the camera and the chassis of the pet companion robot, the pitching motor is controlled to adjust the position of the target rectangle within the field of view, to make sure that RH matches the EH. When, for example, the RH is smaller than EH, the pitching motor is controlled to pitch the camera downward until RH is equal EH. Otherwise, when for example, the RH is larger than EH, the pitching motor is controlled to pitch the camera upward until RH is equal EH, as schematically illustrated in FIGS. 15 and 16 respectively.

Figure 17:
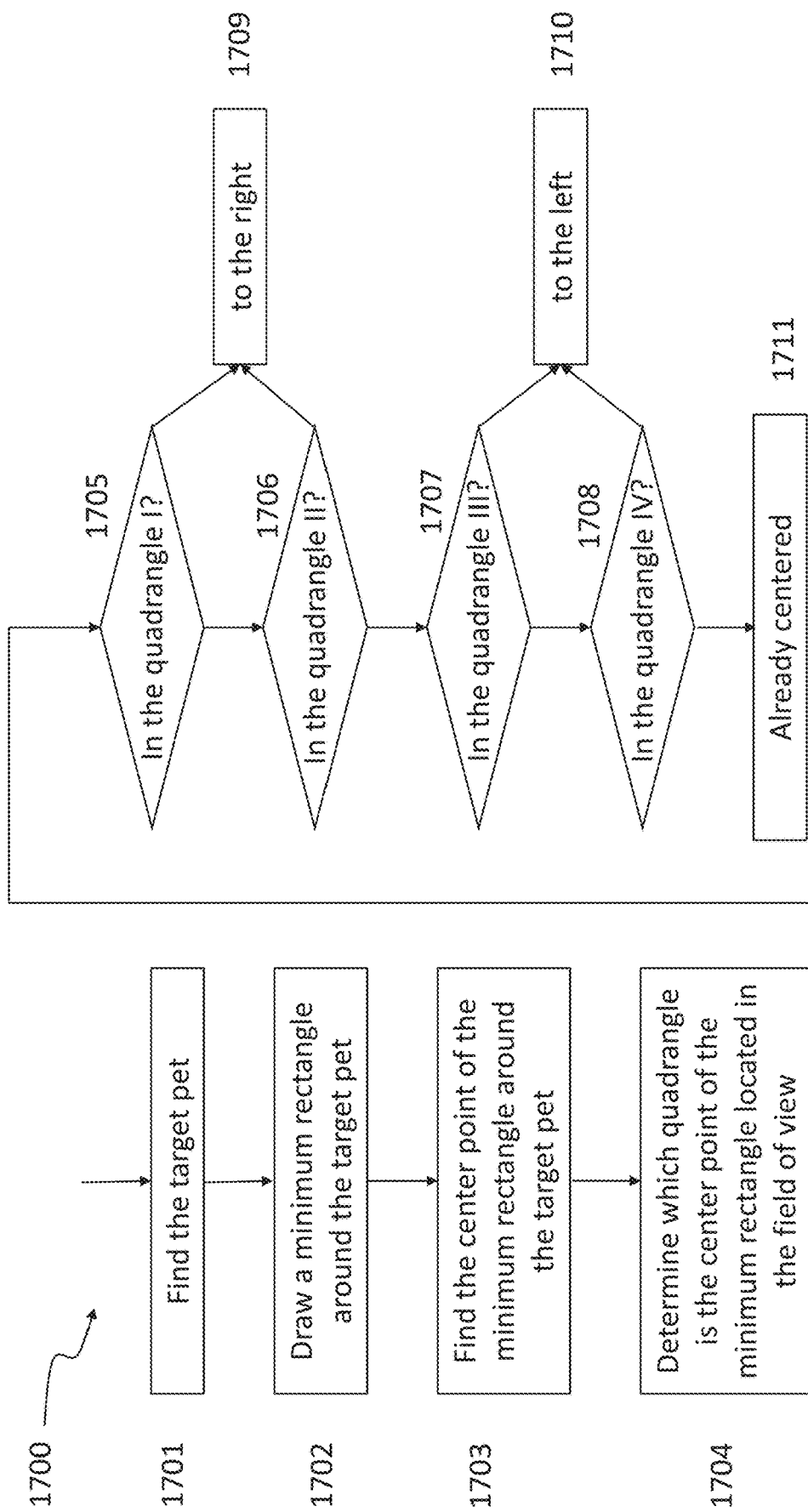
FIG. 17 is a flowchart illustrating the operation of the pet companion robot, according to some embodiments.

FIG. 17 is a flowchart illustrating the operation of the pet companion robot, according to some embodiments. The method 1700 for depth of field tracking and controlling of a pet companion robot device includes a first step 1701, locating the target pet within the field of view of the camera, the field of view of the camera includes a vertical center line, a horizontal center line and a center point O, the width of the field of view if W and the height of the field of view of H. The second step is 1702, drawing a minimum target rectangle around the target pet, with sides of the minimum target rectangle parallel with the corresponding sides of the field of view of the camera, the width of the minimum target rectangle is w and the height of the minimum target rectangle is h. The third step is 1703, locating a center point P of the minimum target rectangle. The fourth step is 1704, determining which quadrangle the center point P is located. When the center point P is located in quadrangles I (1705) and II (1706), go to step 1708, adjusting the pet companion robot device to the right to make the center point P overlap with the vertical center line of the field of view of the camera. When the center point P is located in quadrangles III (1707) and IV (1708), go to step 1710, adjusting the pet companion robot device to the left to make the center point P overlap with the vertical center line of the field of view of the camera. According to some embodiments, the step of adjusting the pet companion robot device to the right can be implemented by controlling one of the at least one camera control motors. The step of adjusting the pet companion robot device to the right can also be implemented by controlling the moving mechanisms of the chassis. The step of adjusting the pet companion robot device to the left can be implemented by controlling one of the at least one camera control motors. The step of adjusting the pet companion robot device to the left can also implemented by controlling the moving mechanisms of the chassis. The method can further include: calculating an actual depth RP, $RP=(w*h)/(W*H)$; and comparing the actual depth RP with a predefined expected depth EP; when RP is smaller than EP, controlling the moving mechanisms of the chassis to move the pet companion robot device closer to the pet. Then calculating a new actual depth RP, $RP=(w*h)/(W*H)$; and comparing the new actual depth RP with a predefined expected depth EP, until RP is equal to RP.

According to some embodiments, the method includes further steps: when RP is larger than EP, controlling the moving mechanisms of the chassis to move the pet companion robot device away from the pet; calculating a new actual depth RP, wherein $RP=(w*h)/(W*H)$; and comparing the new actual depth RP with a predefined expected depth EP, until RP is equal to RP.

The method can include further steps: calculating an actual height RH, RP is a distance between an upper edge of the minimum target rectangle and the horizontal center line of the field of view of the camera; and comparing the actual height RH with a predefined recommended height EH. When RH is smaller than EH, controlling one of the at least one camera control motors to move the camera downward. Calculating a new height RH, RP is a distance between an upper edge of the minimum target rectangle and the horizontal center line of the field of view of the camera; and comparing the new height RH with a predefined recommended height EH, until RH is equal to EH. When RH is larger than EH, controlling one of the at least one camera control motors to move the camera upward. calculating a new height RH; and comparing the new height RH with a predefined recommended height EH, until RH is equal to EH. According to some embodiments, the control unit can be controlled by AI algorithms. The control unit can be controlled remotely by a hand-held device with a touch screen. The control unit can work in an autonomous mode. The chassis with moving mechanisms can be equipped with Mecanum wheels. The chassis with moving mechanisms can be equipped with differential wheels. In wheeled vehicles, the differential allows the outer drive wheel to rotate faster than the inner drive wheel during turning. This is necessary when the vehicle turns, making the wheel that is traveling around the outside of the turning curve roll farther and faster than the inside wheels. The average of the rotational speed of the two driving wheels equals the input rotational speed of the drive shaft. An increase in the speed of one wheel is balanced by a decrease in the speed of the other.

Figure 18:
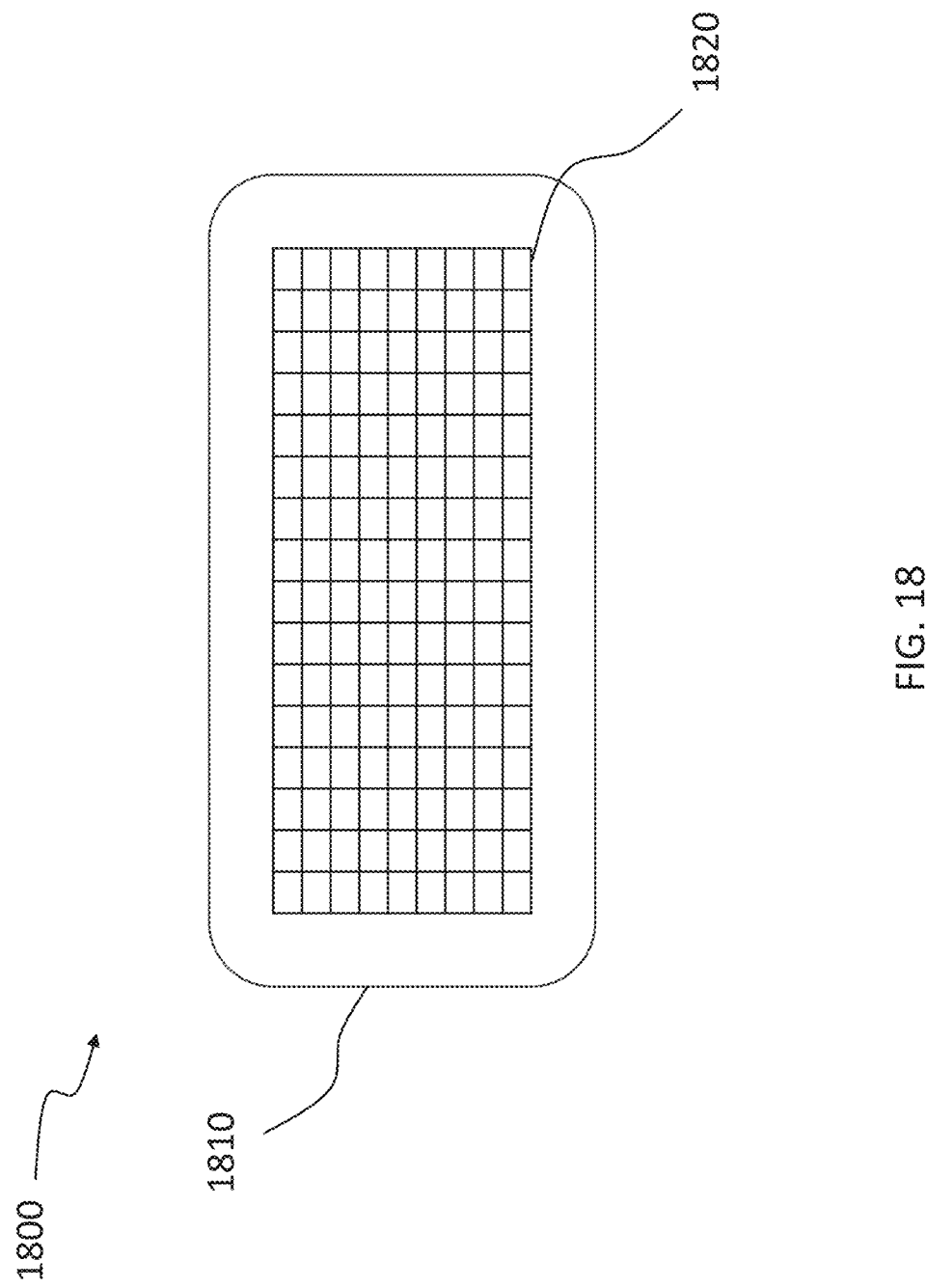
FIG. 18 schematically illustrates the screen matrix indexing scheme of the touch screen of a hand-held device for controlling the pet companion robot, according to some embodiments.

FIG. 18 schematically illustrates the screen matrix indexing scheme of the touch screen of a hand-held device for controlling the pet companion robot, according to some embodiments. According to some embodiments, the number of light source control motors 1430 can be two, i.e., there can be two light source control motors, one for controlling horizontal position of the light source pointing position, and another for controlling the vertical position of the light source pointing position. As discussed above, the pet companion robot can be controlled by a remote controller via WiFi, the cellular network (4G/5G, etc.), or the Internet. The remote controller can be a dedicated remote control device, a PDA, or laptop, or a hand-held mobile device, for example, an iPhone, an iPad, an Android device, etc. The light source can be a laser pointer, and the laser pointer is controlled by two electric motors, sometimes called steering motors for controlling the rotation angels of the laser pointer in horizontal and vertical directions. The steering motors are controlled by the control unit 1800 onboard the pet companion robot device. The control unit 1800 can be a microcontroller unit (MCU), which is connected to a server via WiFi, the cellular network (4G/5G, etc.). The server communicates with the hand-held mobile client device, the conversion between the screen coordinates and rotation angel of the steering motors can be performed wither on the client device, or on the server, then the rotation angel's data is transmitted to the MCU to control the steering motors to rotate appropriate angels. Then the laser light spot is projected to the desired positions, forming a continuously moving laser light curve.

According to some embodiments, the steering motors can be two general purpose electric motors with 180-degree rotation range, and 5~9V working voltage. One of them functions as the vertical steering motor, and the other functions as the horizontal steering motor. Both motors are connected to the MCU via electric wires. When the MCU is powered on, the steering motors are reset to their corresponding initial positions, which are adjusted and aligned with the initial position and orientation of the camera during installation and/or initialization. An App installed on the client side hand-held device 1800, for example with a touch screen 1810. The display and touch area 1820 of the touch screen 1810 is divided into a M by N matrix, for example, $A_{i,j}$ represents the box area with coordinates (i, j) in the $i^{th}$ row and $j^{th}$ column. For example, $A_{2,3}$ represents the box touching area with coordinates (2, 3) in the 2nd row and 3rd column. For a touch screen with ratio 16:9, for example, i=0, 1, 2, 3, ... 8, and j=0, 1, 2, 3 ... 15, there are a total of 144 touching box areas. When $A_{i,j}$ on the touch screen 1820 is touched, $A_{i,j}=1$.

Figure 19B:
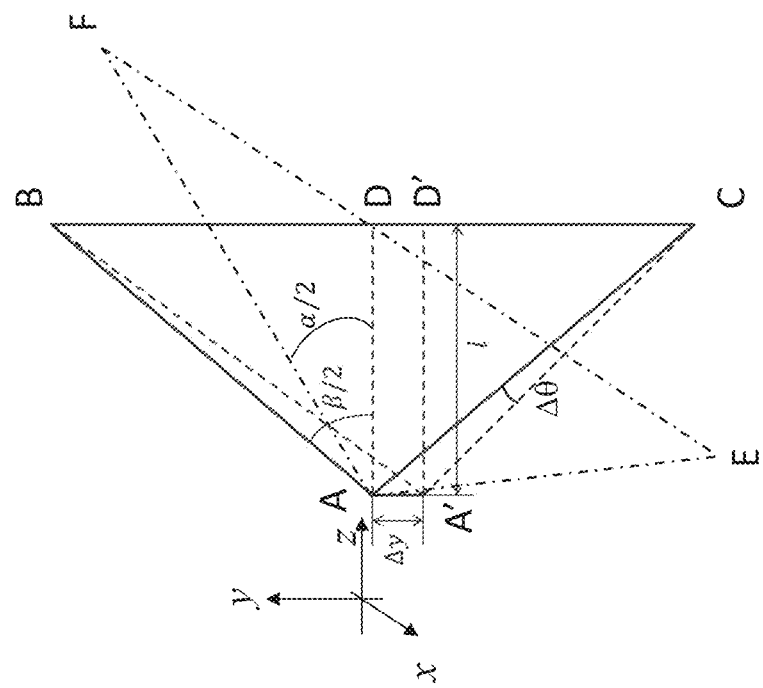
FIGS. 19A and 19B schematically illustrates the angel difference Δθ between the laser pointer and the camera of the pet companion robot, according to some embodiments.
Figure 19A:
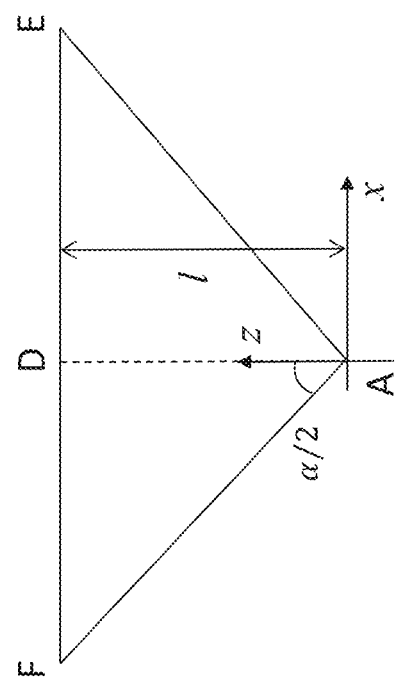

FIGS. 19A and 19B schematically illustrates the angel difference Δθ between the laser pointer and the camera of the pet companion robot, according to some embodiments. A is the position of the camera, and A' is the position of the steering motors of the laser pointer, and Δy is the height difference between the steering motors of laser pointer and the camera in the actual installation, the recommended value s between 1-5 cm. The distance l is the focal length of the camera, the recommended value of l is 0.4~2 m. In FIG. 19B, the triangle ABC is in the vertical y-z plane with BC parallel with the vertical y axis, while the triangle AEF is in the horizontal x-z plane with EF parallel with the horizontal x axis. The vertical viewing angle of the camera is β, the vertical viewing range is (−β/2, β/2), and the horizontal viewing angle of the camera is α, and the horizontal viewing range is (−α/2, α/2). The horizontal viewing angle α and viewing range (−α/2, α/2) is further illustrated in FIG. 19A.

When converting the coordinates on the touch screen into the steering motor rotation angels, the following formulas are followed. For converting the horizontal steering motor rotation angle:

$$\theta_x = -\alpha/2 + \frac{\alpha}{16} \times j + \frac{\alpha}{32}$$

For converting the vertical steering motor rotation angel:

$$\theta_y = -\beta/2 + \frac{\beta}{9} \times i + \frac{\beta}{18} + \Delta\theta$$

where, Δθ is the angular difference between the steering motor and the camera after installation and initialization:

$$\Delta\theta \approx \beta/2 - \arctan\left(\frac{l \times \tan\left(\frac{\beta}{2}\right) - \Delta y}{l}\right)$$

The vertical viewing range of the camera is (−β/2, β/2), the vertical scanning range of the laser pointer is (−β/2+AO, β/2+AO).

Figure 20:
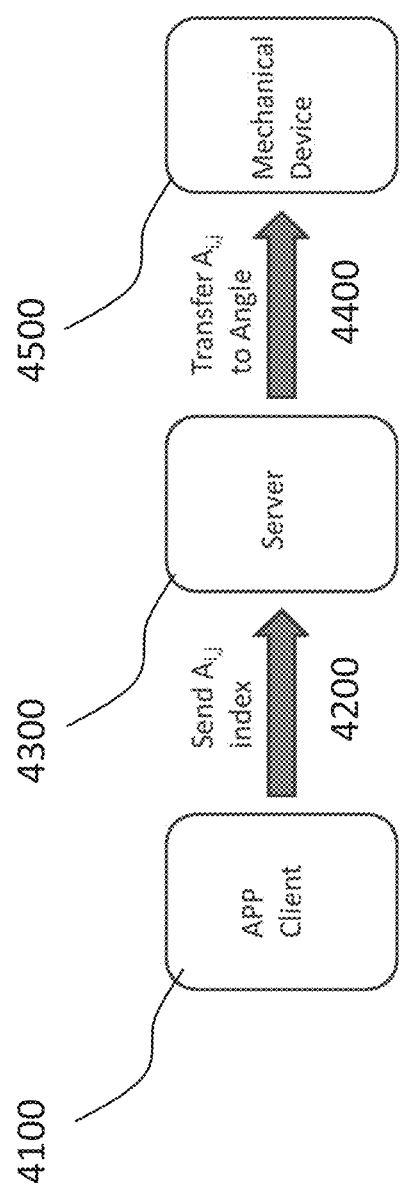
FIG. 20 is a functional chart illustrating the method for converting the screen coordinates into the laser pointer steering motor rotation angels of the pet companion robot, according to some embodiments.

FIG. 20 is a functional chart illustrating the method for converting the screen coordinates into the laser pointer steering motor rotation angels of the pet companion robot, according to some embodiments. As an example, the remote client device 4100 has the App installed, when touched on the $A_{i,j}$ box on the screen, the $A_{i,j}$ is set to 1 and is transmitted to the server 4300 via WiFi or the cellular network, etc. The server calculates and transfer the $A_{i,j}$ information into steering motor rotation angels, which are then transmitted to the MCU o control the steering motors and mechanical parts 4500. Alternatively, the MCU which controls the steering motors can receive the rotation angel's information from the remote client device 4100 directly, which means that the calculation is conducted on the remote client device 4100, not on the server 4300.

Figure 21:
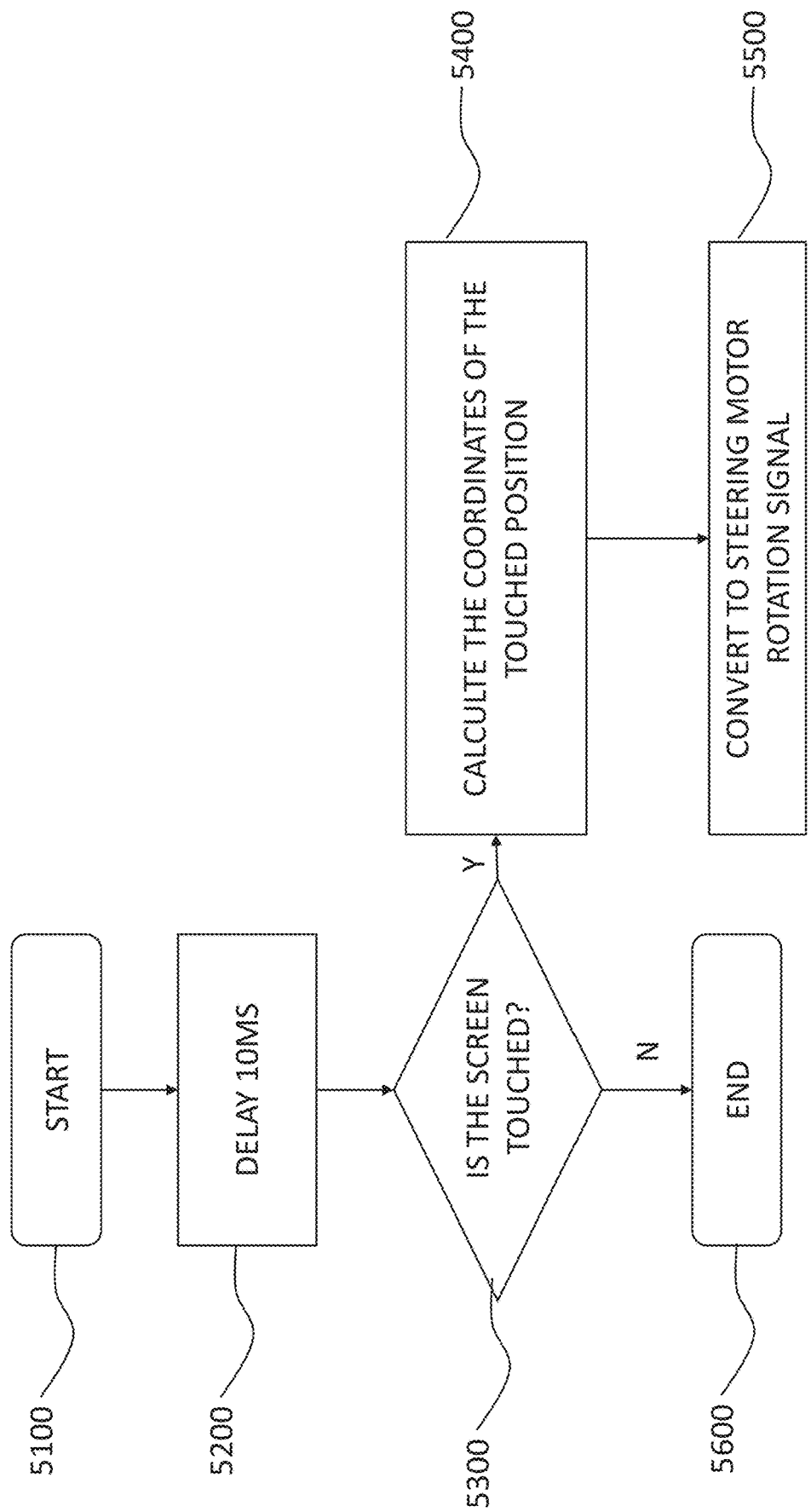
FIG. 21 is another flowchart illustrating the method for converting the screen coordinates into the laser pointer steering motor rotation angels of the pet companion robot, according to some embodiments.

FIG. 21 is another flowchart illustrating the method for converting the screen coordinates into the laser pointer steering motor rotation angels of the pet companion robot, according to some embodiments. At step S100, the system is started, then at step S200, a 10-millisecond delay is performed. In the next step S300, check if the touch screen is touched. If the screen is touched, then at step S400, the coordinates $A_{i,j}$ of the touched position (i, j) are calculated. Then at step S500, the rotation angles for the steering motor are calculated:

$$\theta_x = -\alpha/2 + \frac{\alpha}{16} \times j + \frac{\alpha}{32}$$

$$\theta_y = -\beta/2 + \frac{\beta}{9} \times i + \frac{\beta}{18} + \Delta\theta$$

$$\Delta\theta \approx \beta/2 - \arctan\left(\frac{l \times \tan\left(\frac{\beta}{2}\right) - \Delta y}{l}\right)$$

And then the steering motors are rotated by corresponding angles calculated above. After rotation, the steering motors can be reset to their original starting positions.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. A method for controlling a laser pointer projection of a pet companion robot device, for interacting with a pet, equipped with a camera, a laser pointer, a horizontal laser pointer steering motor and a vertical laser pointer steering motor, a control unit and a wireless remote-control device with a touch screen, the method comprising:
   determining a focal length 1 of the camera;
   determining a height difference Δy between the horizontal and vertical laser pointer steering motors of the laser pointer and the camera;
   determining a horizontal viewing angle α of the camera, wherein a corresponding horizontal viewing range is (−α/2, α/2);
   determining a vertical viewing angle β of the camera, wherein a corresponding vertical viewing range is (−β/2, β/2);
   determining whether the touch screen of the wireless remote-control device is touched;
   when the touch screen of the wireless remote-control device is touched, determining the corresponding coordinates (i, j);
   calculating an angular difference Δθ between the camera and the at least one laser pointer steering motors:

$$\Delta\theta \approx \beta/2 - \arctan\left(\frac{l \times \tan\left(\frac{\beta}{2}\right) - \Delta y}{l}\right)$$

calculating a horizontal steering motor rotation angle $\theta_x$:

$$\theta_x = -\alpha/2 + \frac{\alpha}{16} \times j + \frac{\alpha}{32};$$

calculating a vertical steering motor rotation angle $\theta_y$:

$$\theta_y = -\beta/2 + \frac{\beta}{9} \times i + \frac{\beta}{18} + \Delta\theta.$$

2. The method of claim 1, further comprising:
   transmitting the horizontal steering motor rotation angle $\theta_x$ to the control unit.
3. The method of claim 2, further comprising:
   transmitting the vertical steering motor rotation angle $\theta_y$ to the control unit.
4. The method of claim 3, further comprising:
   rotating the horizontal steering motor by the rotation angle $\theta_x$; and
   rotating the vertical steering motor by the rotation angle $\theta_y$.
5. The method of claim 4, further comprising:
   the horizontal steering motor is reset; and
   the vertical steering motor is reset.
6. The method of claim 4, further comprising:
   determining whether the touch screen of the wireless remote-control device is touched again.
7. The method of claim 6, further comprising:
   when the touch screen of the wireless remote-control device is touched again, determining the corresponding coordinates (i', j').
8. The method of claim 7, further comprising:
   calculating a new horizontal steering motor rotation angle $\theta_x'$:

$$\theta_x' = -\alpha/2 + \frac{\alpha}{16} \times j' + \frac{\alpha}{32}.$$

9. The method of claim 8, further comprising:
   calculating a new vertical steering motor rotation angle $\theta_y'$:

$$\theta_y' = -\beta/2 + \frac{\beta}{9} \times i' + \frac{\beta}{18} + \Delta\theta.$$

10. The method of claim 9, further comprising:
    transmitting the new vertical steering motor rotation angle $\theta_x'$ to the control unit.
11. The method of claim 10, further comprising:
    transmitting the new vertical steering motor rotation angle $\theta_y'$ to the control unit.
12. The method of claim 11, further comprising:
    rotating the horizontal steering motor by the new rotation angle $\theta_x'$; and
    rotating the vertical steering motor by the new rotation angle $\theta_y'$.
13. The method of claim 12, further comprising:
    the horizontal steering motor is reset; and
    the vertical steering motor is reset.
14. The method of claim 1, wherein the calculating a horizontal steering motor rotation angle $\theta_x$ is performed on the wireless remote-control device with the touch screen.
15. The method of claim 1, wherein the calculating a horizontal steering motor rotation angle $\theta_y$ is performed on the wireless remote-control device with the touch screen.

16. The method of claim 1, wherein the calculating a horizontal steering motor rotation angle $\theta_x$ is performed on a server in the cloud.

17. The method of claim 1, wherein the calculating a horizontal steering motor rotation angle $\theta_y$ is performed on a server in the cloud.

18. The method of claim 1, wherein the touch screen displays a real-time video streaming from the camera.

19. A pet companion robot device, for interacting with a pet, controlled by a user with a wireless remote-control device with a touch screen, the pet companion robot device comprising:
- a chassis with a moving mechanism for moving the pet companion robot device;
- a camera for providing a live streaming video or photo of the pet to the touch screen of the wireless remote-control device, wherein the camera has a local length l, a horizontal viewing angle $\alpha$ and a corresponding horizontal viewing range $(-\alpha/2, \alpha/2)$, a vertical viewing angle $\beta$ and a corresponding vertical viewing range $(-\beta/2, \beta/2)$;
- a laser pointer controlled by a horizontal laser pointer steering motor and a vertical laser pointer steering motor for pointing a laser beam; and
- a control unit for controlling the moving mechanism, the camera and the horizontal laser pointer steering motor and the vertical laser pointer steering motor, wherein the control unit communicates with wireless remote-controlled device with the touch screen.

20. The pet companion robot device of claim 19, wherein a height difference between the horizontal and vertical laser pointer steering motors of the laser pointer and the camera is $\Delta y$.

* * * * *